May 16, 1933.  F. H. AHLMAN  1,909,244
FEEDER
Filed May 8, 1930  2 Sheets-Sheet 1
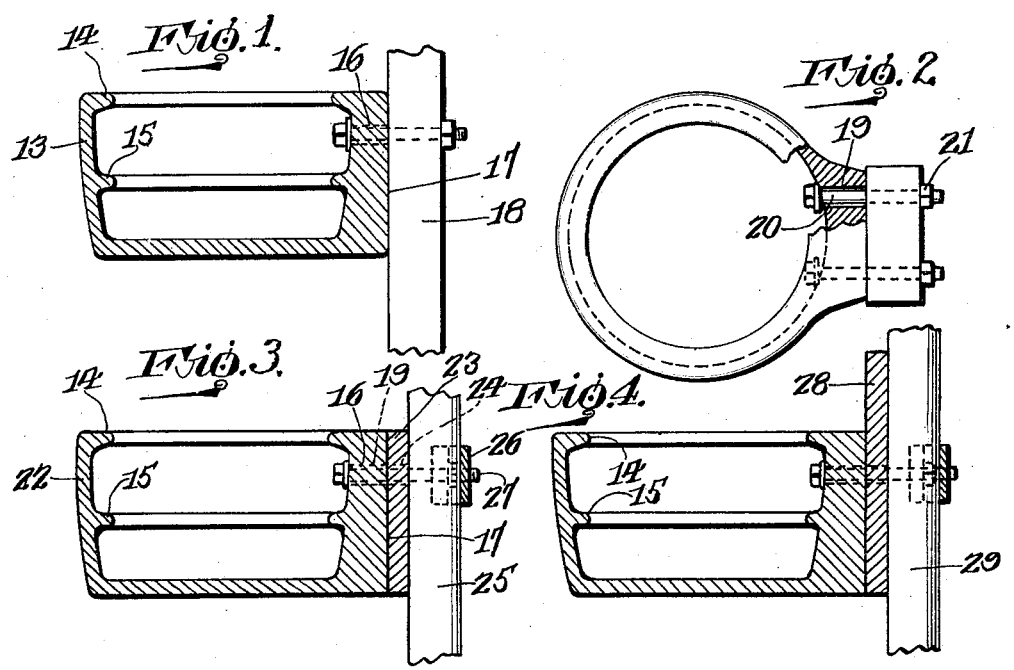
INVENTOR.
Franz H. Ahlman
BY
Geo. P. Kimmel
ATTORNEY.

May 16, 1933.  F. H. AHLMAN  1,909,244
FEEDER
Filed May 8, 1930   2 Sheets-Sheet 2
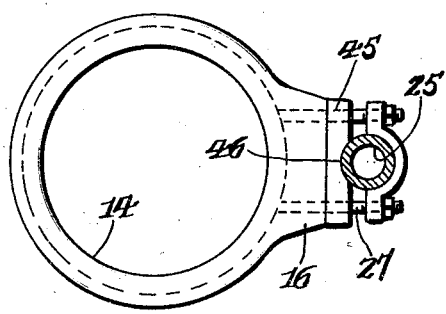
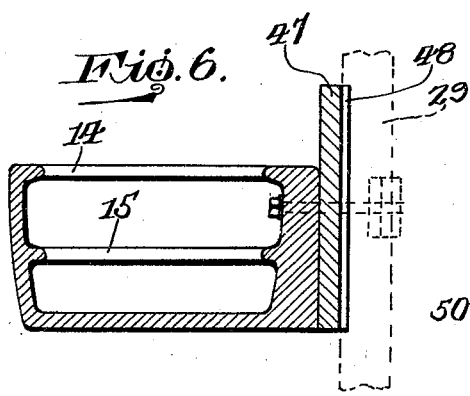
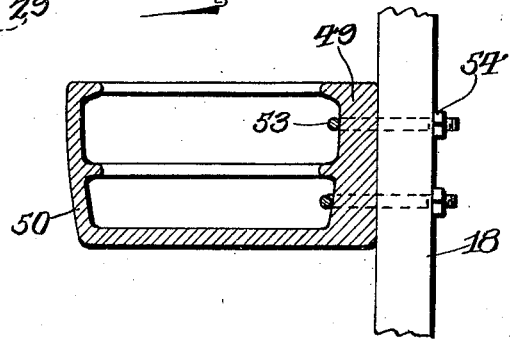
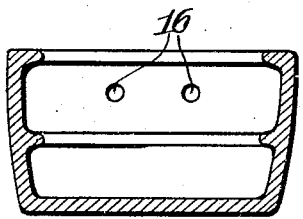
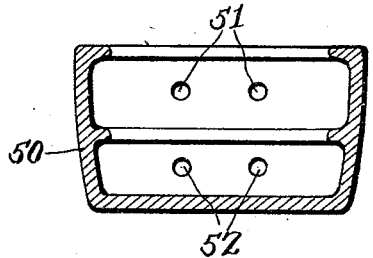
INVENTOR.
Franz H. Ahlman
BY
Geo. P. Kimmel
ATTORNEY.

Patented May 16, 1933

1,909,244

UNITED STATES PATENT OFFICE

FRANZ H. AHLMAN, OF MORRISTOWN, MINNESOTA

FEEDER

Application filed May 8, 1930. Serial No. 450,746.

This invention relates to a feeder for containing salt and the like for livestock, and has for its primary object to provide, in a manner as hereinafter set forth, a feeder of such class which is rust-proof and which may be securely fastened to a support without likelihood of becoming broken or damaged in use.

A further object of the invention is to provide a feeder for the purpose aforesaid which is designed in a manner to prevent livestock from throwing any of the salt out of the feeder, thereby enabling the feeder to be anchored to a metal support without likelihood of the support becoming rusted.

A further object of the invention is to provide a feeder of the character aforesaid which is adapted to be used in connection with a valve for supplying livestock with water.

With the foregoing and other objects in view, the invention consists of the novel construction, combination and arrangement of parts as hereinafter more particularly described, and as illustrated in the accompanying drawings wherein are shown several embodiments of the invention, but it is to be understood that the description and drawings are to be taken as illustrative and that the invention is intended to be limited only by the scope of the claims hereunto appended.

In the accompanying drawings:—

Figure 1 is a vertical section through a feeder in accordance with this invention.

Figure 2 is a sectional plan thereof.

Figure 3 is a vertical section through a further modified form the invention.

Figure 4 is a vertical section through a still further modified form of the invention.

Figure 5 is a plan of a further modified form of the invention.

Figure 6 is a vertical section through a further modified form of the invention.

Figure 7 is a vertical section through a further modified form of the invention.

Figure 8 is a vertical transverse section through a bowl in accordance with those shown in Figures 1, 3, 5 and 7.

Figure 9 is a vertical transverse section through the bowl shown in Figure 7.

Referring to Figures 1 and 2 of the drawings, the numeral 13 designates a bowl formed with an open top. The bowl includes an annular body part or circular wall and a flat bottom. The bowl 13 is formed at its upper edge with an inwardly extending reinforcing lip or rib 14, and in spaced relation to the lip 14, the inner peripheral face of the bowl is provided with a reinforcing rib 15 which is endless. Formed on the outer peripheral face of the bowl 13 is a boss 16 which is provided with a flat outer face 17 for abutment against a flat face post, such as 18. Extending through the boss 16 are a pair of spaced openings 19 for the passage therethrough of bolts 20 which extend through the posts 18 and are provided on their ends with nuts 21.

In the embodiment shown in Figure 3 the bowl 22 is the same in every respect as the bowl 13 described in connection with the embodiment shown in Figures 1 and 2. Positioned against the flat outer face 17 of the boss 16 of the bowl 22 is a spacer block 23, preferably formed of wood, which is provided with openings 24 for alignment with the openings 19 through the boss 16. The block 23 is maintained in position against a cylindrical support 25 by means of a clamp 26 similar to the clamp 9 and a pair of bolts 27 which extend through the openings 19 and 24 and through the clamp 26.

The embodiment illustrated in Figure 4 is the same in every respect to the embodiment illustrated in Figure 3, except that the spacer block 28 is of materially greater height than the spacer block 23 in order that the same may project a material distance above the bowl in order that the latter may be secured to a metal support 29 which will be protected by the projecting upper end of the block 28 from having any of the contents of the bowl thrown onto the support to prevent the latter from becoming rusted.

In the embodiment shown in Figure 5, the structure is the same as that shown in Figure 3 except that the spacer block 45 is formed in its outer face with a screw 46 for the reception of the cylindrical support 25 therein.

In the embodiment shown in Figure 6 the structure is the same as that shown in Figure 4 except that the spacer block 47 is formed in its outer face with a groove 48 for receiving the cylindrical support 29 therein.

In the embodiment shown in Figures 7 and 8 the structure is the same as that shown in Figures 1 and 2 except that the boss 49 of the bowl 50 is provided with superposed pairs of openings 51 and 52, each pair of such openings having extended therethrough the end portions of a U-shaped bolt 53, the ends of the portions of the bolt 53 extending through the flat face support 18 and being secured thereto by means of nuts 54.

It is thought that the many advantages of a feeder in accordance with this invention will be readily apparent, and although the feeder preferably will be constructed in accordance with one of the embodiments herein illustrated and described, it is to be understood that changes in the details of construction may be resorted to so long as such changes fall within the scope of the invention as defined in the appended claim.

What I claim is:

A feeder comprising a bowl having an annular body part and a flat bottom, said body part having an endless uninterrupted rounded top edge, the inner face of said body part being flared throughout from said bottom, said body part having its inner face provided with a pair of superposed spaced inwardly extending endless reinforcing ribs, said body part being formed with a pair of spaced parallel openings positioned between said ribs, a boss on the outer face of said body part, a support positioned against said boss, and holdfast devices extending through the openings for anchoring the body part to said support, the inner ends of said devices being arranged inwardly with respect to the edges of said ribs.

In testimony whereof, I affix my signature hereto.

FRANZ H. AHLMAN.